Patented Mar. 25, 1924.

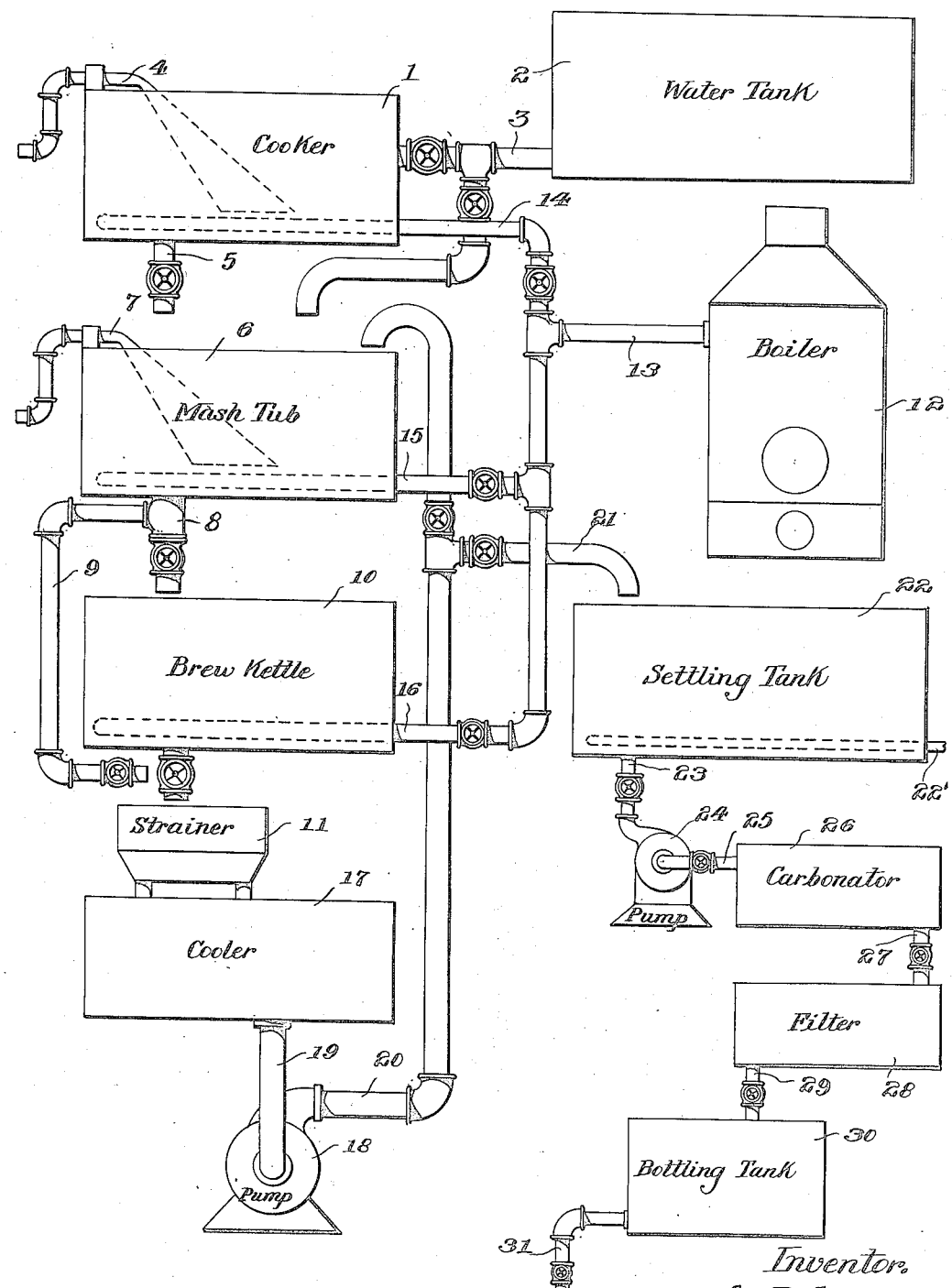

1,487,842

UNITED STATES PATENT OFFICE.

ANTON DOLENZ, OF SAN FRANCISCO, CALIFORNIA.

PROCESS OF MAKING LOW-ALCOHOLIC-CONTENT BEVERAGE.

Application filed August 30, 1919. Serial No. 320,900.

*To all whom it may concern:*

Be it known that I, ANTON DOLENZ, citizen of the United States, residing at San Francisco, in the county of San Francisco, State of California, have invented a new and useful Process of Making Low-Alcoholic-Content Beverage, of which the following is a specification in such full and clear terms as will enable those skilled in the art to construct and use the same.

This invention relates to a beverage of the effervescent type, similar in all respects to beer, except that it has an alcoholic content of less than one half of one per cent by volume.

An object of the invention is to produce a beverage which will have all of the beneficial ingredients of beer without the effects due to beers having a larger alcoholic content than one half of one per cent by volume.

Another object of the invention is to produce a beverage which will be in appearance and in the volume produced, as well as in taste, substantially the same as beers having a larger alcoholic content.

Another object of the invention is to produce a beverage of the beer type in the shortest possible time, and with the minimum changes from one kettle or tank to another.

Another object of the invention is to produce a beverage which will have excellent keeping qualities regardless of the fact that its alcoholic content is below that usually deemed necessary to preserve such beverages.

Another object of the invention is to produce a beverage which may be shipped either in bottles or in wood barrels if that is desired, the fermentation being carried to such a point as to insure the keeping qualities of the beverage even when placed in barrels.

Another object of the invention is to produce a beer by a process which may be carried out in the ordinary brewery with the present apparatus and in a much simpler manner than the ordinary beer of higher alcoholic content is produced, and also in a simpler manner than the process for producing the ordinary non-alcoholic beverages.

Another object of the invention is to produce a beverage by a process which will enable the brew house equipment used in the ordinary breweries to be used at two intermediate stages of the process, thereby reducing the expense for apparatus used in producing the beverage.

Another object of the invention is to provide a method for the manufacture of malt beverages, including beer, ale, stout, porter, tonics and similar malt products, whereby the fermentation is controlled in such a manner that the per cent of alcohol produced may be kept below one half of one per cent; or, when the statutes permit, the product may be allowed to ferment to any desired degree of attenuation. A further object of my invention is to produce a beverage which by rapid clarification and the rapid development of a suitable character shall reduce the time required in its manufacture, eliminate storage and reduce the amount of refrigeration incident to the production of like beverages as now practiced in the art, and a higher alcoholic content may be developed if permissible.

In the practice of my invention, I may use any malted cereal with or without the addition of unmalted cereals such as rice, corn or wheat; but I prefer to use barley malt, ground to a coarse grist, which I mash with water under conditions as now practiced in the art and suitable for the formation of a beer or ale or stout or porter of such character as I may desire to impart to the finished product. The saccharified malt infusion, commonly known as wort, is drawn from the grains in the usual manner, part of which is heated at 75° C. for a period ranging from ten to thirty minutes and stored in a sterile vessel until required, while the other and remaining part of the wort is boiled with hops, from 0.3 to 2 pounds per barrel; depending upon the hop character desired. The relative amounts of wort which I withdraw for heating may vary within considerable limits, but, by way of illustration, I may use 25% of the total volume, boiling the remaining 75% with hops. The heated wort on the one hand, and the boiled wort on the other are then cooled to a temperature which may vary from 20° to 30° C. and run directly into a suitable tank, provided with a means for heating with steam, either direct or indirect, and a means for ventilating with natural or forced draft. The mechanical equipment forms no part of the present invention and I may use either the mash tub, the cooker or the kettle of the ordinary brew house equipment. I prefer to use the mash tub as I have found by practical experience that this is particularly well adapted for the fermentation part of the process. I then add a suitable quantity of compressed or liquid yeast, calculated for the compressed yeast to from 0.1 to 0.5 pound per barrel or wort to be fermented. If I use compressed yeast, it is first broken up and mixed to a thin uniform mass with a small quantity of wort which is then poured into wort to be fermented and immediately distributed by operating the agitator in the mash tub. The wort is now carefully maintained at a temperature between 20° and 30° C. for a period of from two to twenty five hours, depending upon the amount of sugar contained in the wort and the degree of fermentation desired. During this period I aerate and from time to time agitate the fermenting liquid to carry off the volatile products of fermentation, as I have found by experience that this facilitates the fermentation and reduces the time required for the wort to show the particular degree of fermentation. When the degree of fermentation has reached the desired point, I check the action of the yeast by raising the temperature of the fermenting wort to about 75° C. and maintain this temperature for a short period, approximately ten minutes to check further fermentation. I then cool the fermented wort to a temperature near the freezing point by running it over the usual cooler and into a settling tank; or, I may run it directly from the mash tub into the settling tank provided with attemperators. Here it is allowed to remain for a period sufficient for the suspended protein and other matter to settle, usually from two to twelve hours.

Practising my invention in the manufacture of nonintoxicating beverages of less than one half of one per cent of alcohol, and in which I desire to reduce the maltose content to less than one per cent to insure that the finished product under no condition will develop, or be capable of developing, more than one half of one per cent of alcohol, I proceed as above, excepting that when the fermenting wort reaches one half of one per cent alcohol, I run a part thereof into the brew kettle and remove the alcohol by aeration or by boiling, or by other means, after which I return it again to the remainder in the mash tub and continue the fermentation. This operation is continued, thus keeping the alcoholic content below one half of one per cent, until the sugar content is reduced to the desired per cent, and this can be accomplished in a time well within a practical and economical limit. The fermented wort is then finished as above indicated.

In the drawings there is illustrated a diagrammatic side elevation of a plant equipped to produce this beverage.

In this plant, 1 indicates the cooker, 2 the water supply tank which has a pipe 3 leading to the cooker. The cooker is provided with a stirrer 4 and the cooker discharges through a pipe 5 into the mash tub 6. The mash tub 6 has a stirrer 7 and it discharges through the pipe 8 into the brew kettle 10, a pipe 9 leading to the strainer 11.

In order that the cooker, mash tub and brew kettle may be heated to any desired temperature at will, there is provided the steam boiler 12 with a steam supply pipe 13 having branches 14, 15 and 16 leading into the bottom of the cooker, mash tub and brew kettle respectively.

The strainer 11 is mounted adjacent a cooler 17 which has a discharge pipe 19 leading to the pump 18 and a pipe 20 leads from the pump back to the mash tub. A branch pipe 21 makes it possible to deliver the fluid from the pump 18 to the settling tank 22 in which there are cooling pipes 22', and from which the discharge pipe 23 leads to the pump 24.

The pump 24 is connected by the pipe 25 with the carbonator 26 and this is connected by the pipe 27 with the filter 28. A pipe 29 connects the filter with the bottling tank 30 and from this tank a pipe 31 is connected to any suitable bottling apparatus. All the pipes have suitable valves to properly direct the course of the liquids.

The material is first charged into the cooker 1 with a sufficient supply of water and it is there given only a preliminary treatment at a temperature not over 80° C., after which it is run into the mash tub 6 where it is maintained at a temperature of from 75° to 80° centigrade for a period of three hours.

At the end of the mash period, the liquid known to the art as "wort" is drawn off, about twenty (20) to twenty-five (25) per cent being run into the brew kettle 10 where it is sterilized for ten (10) minutes and then run to the cooler 17.

The remainder of the wort is then run into the brew kettle and boiled until the proper break or precipitate of the flocculent proteids is observed by the brew master, this period usually being from one to four hours.

The reason for boiling a portion of the wort is to extract the flavors of the hops and to precipitate the proteins, while the reason for pasteurizing the remainder of the wort is to impart a desirable taste and body to the finished product, which is lost if the entire mass is boiled.

The boiled wort and the sterilized wort are then mixed in the cooler 17 where the temperature is reduced to about 20 degrees to thirty (30) degrees centigrade and the mixture is then returned to the mash tub 6 by the pump 18. In the mash tub, the temperature of the liquid is maintained at from twenty (20) degrees to thirty (30) degrees centigrade for a period of from 2 to twenty-five (25) hours, the yeast being added previously.

While the desired fermentation is taking place, the liquid is agitated to free it from the gases of fermentation. When the desired attenuation has been reached, the steam is turned on and the entire body of liquid in the mash tub is raised to about seventy-five (75) degrees centigrade and kept at that temperature for a period of ten (10) minutes.

Thereupon the fermented liquid is run into the settling tank 22 and cooled to about the freezing point.

After two (2) to twelve (12) hours it is ready to be pumped to the carbonating tank 26, filter 28 and bottling tank 30.

From this point it may be placed in the bottles for shipment.

If the product is to be shipped in wood, the fermentation is carried on until the maltose content is below one (1) per cent, the alcohol being continuously removed by suitable methods to keep the alcoholic content always below one half of one per cent, after which the same treatment is applied.

What I claim as new and desire to secure by Letters Patent is—

1. The process of manufacturing a malt beverage consisting in, fermenting a saccharified and hopped cereal infusion at a temperature which may be varied from 20 to 30° (C.); aerating and stirring the infusion until it shows a predetermined alcohol content; limiting the alcoholic content by separating a portion of the infusion; dealcoholizing the separated portion of the infusion and returning it to the remainder of the infusion.

2. In the manufacture of a non-intoxicating beverage, the process of limiting the alcoholic content of the fermenting wort to one-half per cent of the total volume comprising, separating a portion of the fermenting wort, dealcoholizing the separated portion and returning it to the remainder.

3. The process of manufacturing a malt beverage, consisting in fermenting a mixture of a saccharified cereal infusion and a hopped saccharified cereal infusion at a temperature varying from 20 degrees to 30 degrees C.; aerating and stirring the fermenting infusion until it shows an alcoholic content of approximately one-half per cent of the total volume; limiting the alcoholic content by separating a portion of the fermenting infusion; dealcoholizing the separated portion and returning it to the remainder.

4. A process for producing a malt beverage consisting in maintaining a cereal mash at a suitable temperature for a length of time necessary to produce a wort; dividing the wort into two portions; heating one portion; boiling the other portion of the wort; mixing the two portions; fermenting the mixture at a temperature varying from 20 degrees to 30 degrees C. until a low volume of alcohol is produced, and limiting the alcoholic content by separating a portion of the fermenting wort; dealcoholizing the separated portion and returning it to the remainder.

5. The process of manufacturing a malt beverage consisting in fermenting a mixture of a saccharified cereal infusion and a hopped saccharified cereal infusion at a temperature which may be varied from 20 to 30 degrees C.; aerating and stirring the fermenting infusion until it shows an alcoholic content and limiting the alcoholic content by separating a portion of the fermenting infusion, dealcoholizing the separated portion and returning it to the remainder; and continuing the fermentation and dealcoholizing until the desired alcoholic content has been obtained.

In testimony whereof I have hereunto set my hand this 20th day of August, A. D. 1919.

ANTON DOLENZ.